United States Patent
Santos et al.

(10) Patent No.: US 8,392,628 B2
(45) Date of Patent: Mar. 5, 2013

(54) SHARING MEMORY SPACES FOR ACCESS BY HARDWARE AND SOFTWARE IN A VIRTUAL MACHINE ENVIRONMENT

(75) Inventors: Jose Renato G. Santos, San Jose, CA (US); Yoshio Turner, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 104 days.

(21) Appl. No.: 12/838,256

(22) Filed: Jul. 16, 2010

(65) Prior Publication Data

US 2012/0017029 A1 Jan. 19, 2012

(51) Int. Cl.
*G06F 13/28* (2006.01)
(52) U.S. Cl. ............. 710/22; 711/6; 711/147; 711/206
(58) Field of Classification Search .................. None
See application file for complete search history.

(56) References Cited

U.S. PATENT DOCUMENTS

| 5,555,385 | A | 9/1996 | Osisek |
| 6,397,242 | B1 | 5/2002 | Devine et al. |
| 6,684,305 | B1 * | 1/2004 | Deneau .................. 711/159 |
| 7,490,191 | B2 | 2/2009 | Illikkal et al. |
| 7,512,769 | B1 * | 3/2009 | Lowell et al. ............. 711/203 |
| 7,552,298 | B2 | 6/2009 | Bestler |
| 7,636,442 | B2 | 12/2009 | Scarlata et al. |
| 2007/0226450 | A1 | 9/2007 | Engbersen et al. |
| 2010/0031360 | A1 | 2/2010 | Seshadri et al. |
| 2010/0100648 | A1 * | 4/2010 | Madukkarumukumana et al. ......................... 710/22 |
| 2010/0161929 | A1 * | 6/2010 | Nation et al. ............. 711/170 |

OTHER PUBLICATIONS

Intel Corp., "Intel 82598 10 GbE ethernet controller open source datasheet," 2008. Revision 2.3, 319282-002, http://people.freebsd.org/~wpaul/OpenSDM_82598-DS-23.pdf, 472 pages.
Huggahalli et al., "Direct Cache Access for High-Bandwidth Network I/O," In International Symposium on Computer Architecture (ISCA), 2005, 10 pages.
Advanced Micro Devices, Inc., "IOMMU Architectural Specification," [retrieved from http://netbsd.mirrors.tds.net/pub/NetBSD/misc/cegger/hw_manuals/amd/amd_iommu_34434.pdf] Feb. 2007, PID 34434 Rev 1.20., 79 pages.
Abramson, D. et al., "Intel virtualization technology for directed I/O," Intel Technology Journal 10, 3, (Aug. 2006). www.intel.com/technology/itj/2006/v10i3, 16 pages.

(Continued)

*Primary Examiner* — Idriss N Alrobaye
*Assistant Examiner* — Dayton Lewis-Taylor

(57) ABSTRACT

Example methods, apparatus, and articles of manufacture to share memory spaces for access by hardware and software in a virtual machine environment are disclosed. A disclosed example method involves enabling a sharing of a memory page of a source domain executing on a first virtual machine with a destination domain executing on a second virtual machine. The example method also involves mapping the memory page to an address space of the destination domain and adding an address translation entry for the memory page in a table. In addition, the example method involves sharing the memory page with a hardware device for direct memory access of the memory page by the hardware device.

18 Claims, 9 Drawing Sheets

OTHER PUBLICATIONS

Ben-Yehuda, M. et al., "Utilizing IOMMUs for virtualization in Linux and Xen," In Ottawa Linux Symposium (2006), 15 pages.
Ben-Yehuda, M. et al., "The price of safety: evaluating IOMMU performance," In Ottawa Linux Symposium (2006), 13 pages.
Willmann, P., Cox, A. L., and Rixner, S., "Protection strategies for direct access to virtualized I/O devices," In USENIX Annual Technical Conference (Jun. 2008), 14 pages.
Fraser, K. et al., "Safe hardware access with the Xen virtual machine monitor," In 1st Workshop on Operating System and Architectural Support for the on demand IT InfraStructure (OASIS) (Oct. 2004), 10 pages.
Advanced Micro Devices, Inc., "AMD I/O Virtualization Technology (IOMMU) Specification" [retrieved from http://support.amd.com/us/Embedded_TechDocs/34434-IOMMU-Rev_1.26_2-11-09.pdf] Feb. 2009, PID 34434.Rev 1.26., 90 pages.
Kim, K. et al., "Inter-domain socket communications supporting high performance and full binary compatibility on Xen," In VEE '08: Proceedings of the International Conference on Virtual Execution Environments, pp. 11-20, ACM, Mar. 2008, 10 pages.
Willmann et al., "Concurrent Direct Network Access for Virtual Machine Monitors," In Proceedings of the 13th International Symposium on High-Performance Computer Architecture (HPCA-13), 2007, 12 pages.
Shinagawa et al., "BitVisor: A Thin Hypervisor for Enforcing I/O Device Security," In Proceedings of the 2009 ACM SIGPLAN/SIGOPS international conference on Virtual execution environments, 2009, pp. 121-130.
Ram et al., "Achieving 10 Gb/s using Safe and Transparent Network Interface Virtualization," In Proceedings of the 2009 ACM SIGPLAN/SIGOPS international conference on Virtual execution environments, Feb. 6, 2009, 10 pages.
Ram et al., "Redesigning Xen's Memory Sharing Mechanism for Safe and Efficient I/O Virtualization," Published and presented at the Second Workshop on I/O Virtualization (WIOV '10), Mar. 13, 2010, Pittsburgh, PA, USA, 8 pages.
Abramson et al., "Intel Virtualization Technology for Directed I/O," Intel Technology Journal, 10(3), Aug. 2006, 179-192.
Chinni et al., "Virtual Machine Device Queues," Intel Corp. White Paper, 2007, 4 pages.
Chou et al., "An Empirical Study of Operating System Errors." In Symposium on Operating Systems Principles (SOSP), New York, NY, USA, 2001, 16 pages.
Clark et al., "Live Migration of Virtual Machines," In Symposium on Networked Systems Design and Implementation (NSDI), 2005, 14 pages.
Ram et al., "Redesigning Xen's Memore Sharing Mechanism for Safe and Efficient I/O Virtualization," WIOV '10, Mar. 13, 2010, 28 pages.
Fraser et al., "Safe Hardware Access with the Xen Virtual Machine Monitor," In 1st Workshop on Operating System and Architectural Support for the on demand IT InfraStructure (OASIS), Oct. 2004, 10 pages.
Leonid Grossman, "Large Receive Offload Implementation in Neterion 10GbE Ethernet Driver," In Ottawa Linux Symposium (OLS), 2005, 8 pages.
LeVasseur et al., "Unmodified Device Driver Reuse and Improved System Dependability via Virtual Machines," In Symposium on Operating Systems Design and Implementation (OSDI), 2004, 14 pages.
Mansley et al., "Getting 10 Gb/s from Xen: Safe and Fast Device Access from Unprivileged Domains," In Euro-Par 2007 Workshops: Parallel Processing, 2007, 10 pages.
A. Menon and W. Zwaenepoel, "Optimizing TCP Receive Performance," In USENIX Annual Technical Conference, Jun. 2008, 14 pages.
Menon et al., "Diagnosing Performance Overheads in the Xen Virtual Machine Environment," In Conference on Virtual Execution Environments (VEE), Jun. 2005, 11 pages.
Menon et al., "Optimizing Network Virtualization in Xen," In USENIX Annual Technical Conference, Jun. 2006, 14 pages.
Microsoft, "Hyper-V architecture" [retrieved from http://msdn.microsoft.com/enus/ library/cc768520.aspx], 2010, 2 pages.
PCI SIG, "I/O Virtualization" [retrieved from www.pcisig.com/specifications/iov/], 2010, 1 page.
H. Raj and K, Schwan, "High Performance and Scalable I/O Virtualization via Self-Virtualized Devices," In International Symposium on High Performance Distributed Computing (HPDC), Jun. 25-29, 2007, 10 pages.
Scott Rixner, "Network Virtualization: Breaking the Performance Barrier," ACM Queue, Mar. 4, 2008, 5 pages.
Santos et al., "Bridging the Gap Between Software and Hardware Techniques for I/O Virtualization," In USENIX Annual Technical Conference, Jun. 2008, 16 pages.
Neterion, "Product brief : Neterion X3100 series," [retrieved from http://www. neterion.com/products/pdfs/X3100ProductBrief.pdf] Feb. 2009, 2 pages.
Sapuntzakis et al., "Optimizing the Migration of Virtual Computers," In Symposium on Operating Systems Design and Implementation (OSDI), Dec. 2002, 14 pages.
Swift et al., "Improving the Reliability of Commodity Operating Systems," ACM Trans. Comput. Syst., 23(1):77-110, 2005, 33 pages.
Willmann et al., "Concurrent Direct Network Access for Virtual Machine Monitors," In International Symposium on High-Performance Computer Architecture (HPCA), Feb. 2007, 12 pages.
Willmann et al., "Protection Strategies for Direct Access to Virtualized I/O Devices," In USENIX Annual Technical Conference, Jun. 2008, 23 pages.
Zhai et al., "Live Migration with Pass-Through Device for Linux VM," In Ottawa Linux Symposium (OLS), 2008, 10 pages.
The Netperf Benchmark. [retrieved from http://www.netperf.org] 2 pages.
Barham et al., "Xen and the Art of Virtualization," In SOSP '03: Proceedings of the 19th Symposium on Operating Systems Principles, ACM, Oct. 2003, 14 pages.
M. Ben-Yehuda, J. Mason, O. Krieger, J. Xenidis, L. Van Doom, A. Mallick, J. Nakajima, and E. Wahlig, "Utilizing IOMMUs for virtualization in Linux and Xen," In OLS '06: Proceedings of the Ottawa Linux Symposium, Jul. 2006, 15 pages.
Ben-Yehuda et al., "The Price of Safety: Evaluating IOMMU Performance," In OLS '07: Proceedings of the Ottawa Linux Symposium, Jun. 2007, 34 pages.
D. Ongaro, A. L. Cox, and S. Rixner, "Scheduling I/O in virtual machine monitors," In VEE '08: Proceedings of the International Conference on Virtual Execution Environments, ACM, Mar. 2008, 10 pages.
Recio et al., "RFC 5040: A Remote Direct Memory Access Protocol Specification," Oct. 2007, 57 pages.
Zhang et al., "XenSocket: A High-Throughput Interdomain Transport for Virtual Machines," In Middleware '07: Proceedings of the International Conference on Middleware, Springer-Verlag New York, Inc., Aug. 2007, 20 pages.

* cited by examiner

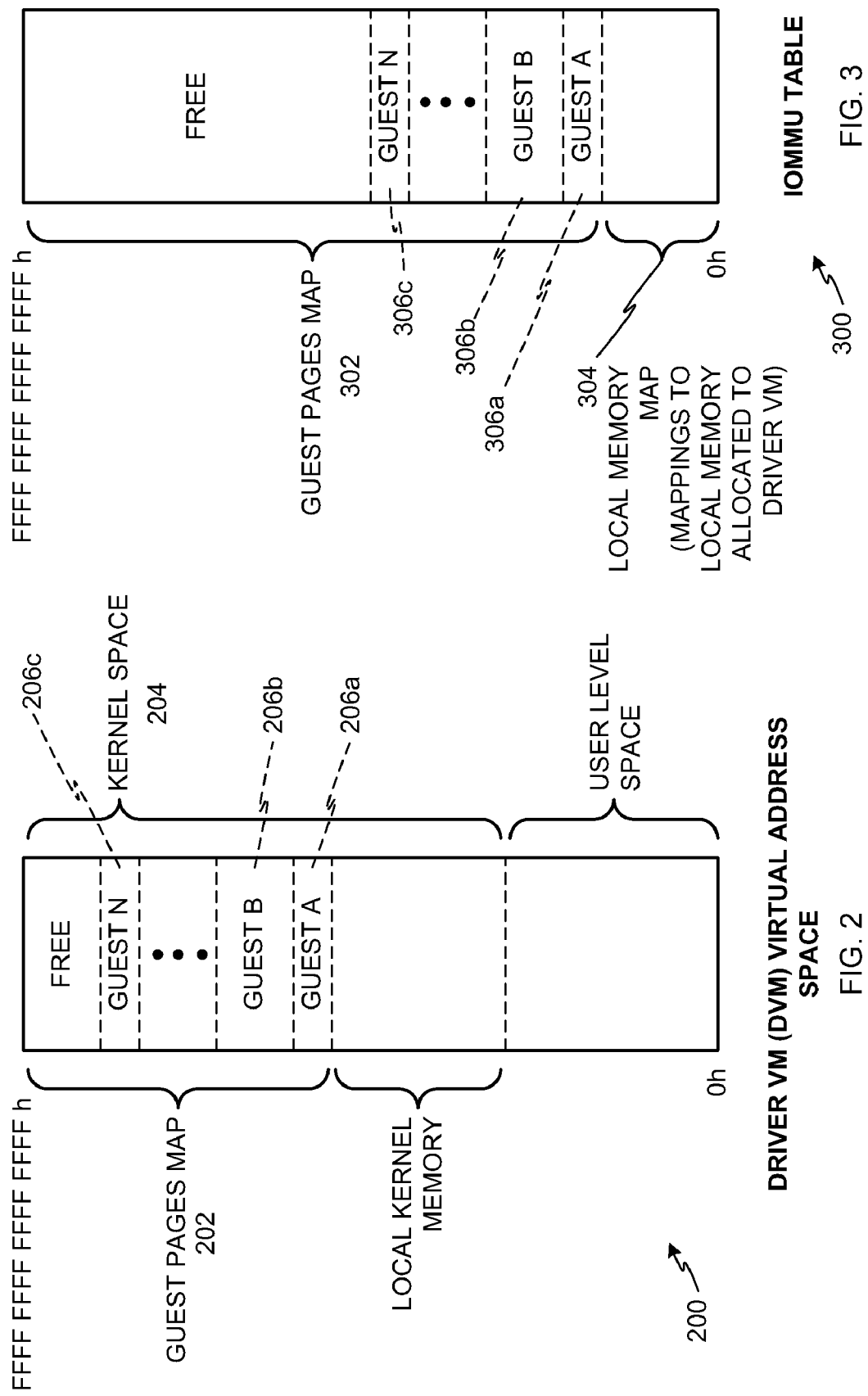

INITIALIZATION

SHARING MEMORY SPACES FOR ACCESS BY HARDWARE AND SOFTWARE IN A VIRTUAL MACHINE ENVIRONMENT

BACKGROUND

Virtual machine (VM) environments enable multiple VMs to execute on a single processor system as separate logical operating entities. Typically, the logically separated VMs share common resources of the processor system such as hardware devices and device drivers. To manage the co-existence of the multiple VMs and to enable exchanging information with common resources and between the VMs, VM environments often use a virtual machine monitor (VMM) or hypervisor.

In known VM systems, a VM can share its memory space with other VMs or hardware devices using the VMM or hypervisor. For example, to share a memory page with another VM, the VM can grant the sharing of its memory page through the hypervisor. To share the memory page with a hardware device, the VM must invoke a separate memory page sharing grant. In such known systems, to ensure protection of the memory page from improper accesses by the hardware device and software running on the other VM, the hypervisor uses separate memory management and protection techniques implemented as separate processes without any collaboration therebetween.

BRIEF DESCRIPTION OF THE DRAWINGS

FIG. 2 depicts an example driver virtual machine (DVM) virtual address space data structure that can be managed by the example hypervisor of FIG. 1.

FIG. 3 is an example input/output memory management unit (IOMMU) table that can be managed by the example hypervisor of FIG. 1.

DETAILED DESCRIPTION

Figure 1:
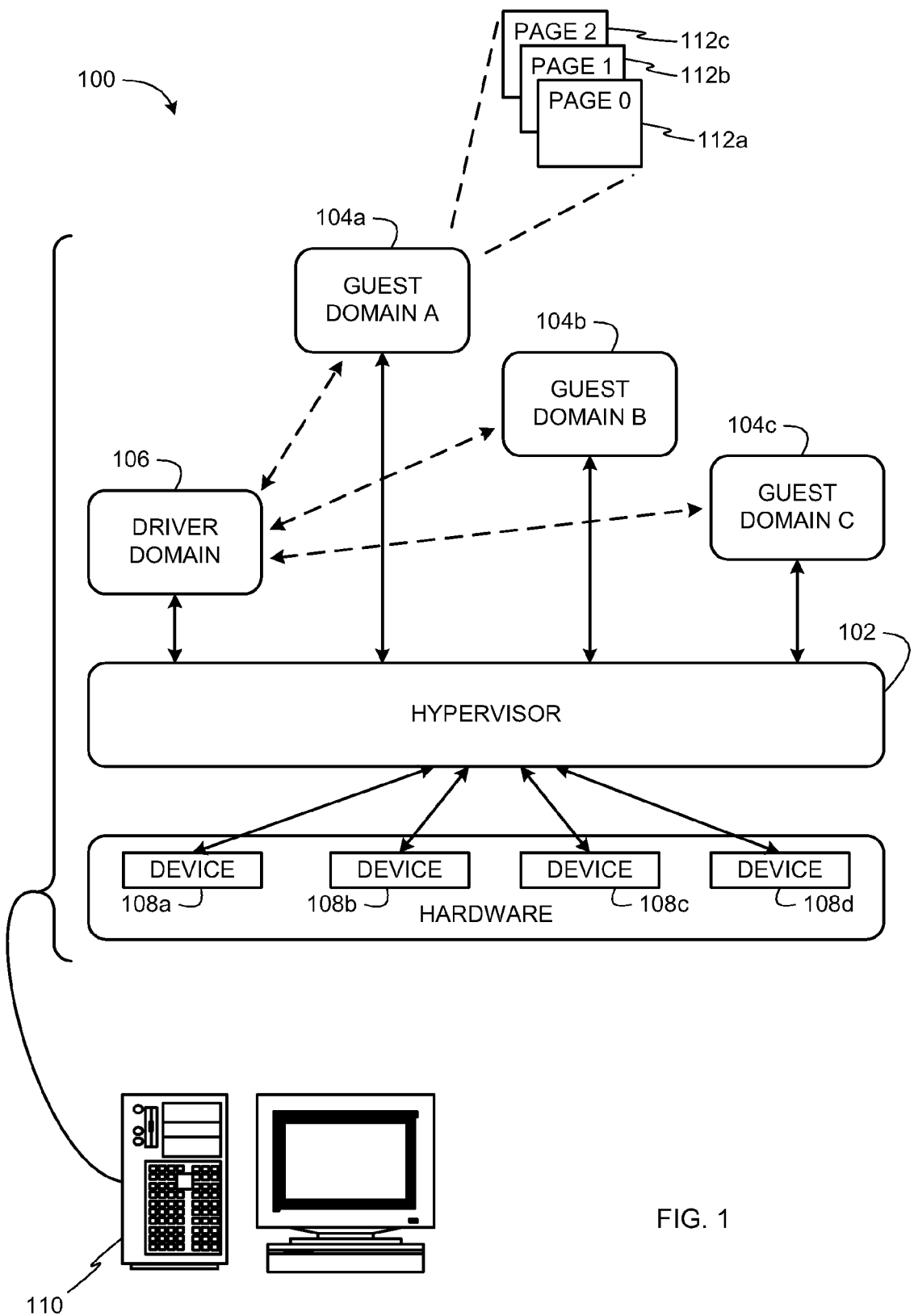
FIG. 1 depicts an example virtual machine computing environment constructed in accordance with the teachings of this disclosure.

The example methods, apparatus, and articles of manufacture described herein can be used to share memory spaces for access by hardware devices and software in a virtual machine (VM) environment. In particular, the example methods, apparatus, and articles of manufacture described herein enable a guest VM (e.g., a source VM) to selectively share a memory page with a second VM (e.g., a destination VM) while, at the same time, sharing the memory page with a hardware input/output (I/O) device supported by (e.g., programmed by) the second VM. In this manner, the memory of the guest VM can be protected by allowing the second VM and the hardware I/O device to access the memory only when the guest VM explicitly shares its pages. In the illustrated examples described herein, shared memory pages can be, for example, I/O buffers or any other type of memory space.

In some example methods, apparatus, and articles of manufacture described herein, limiting the sharing of pages to only those pages that need to be shared (e.g., sharing only pages that need to be shared for purposes of I/O transactions) reduces instances and/or prevents software and/or device driver bugs from corrupting the guest memory or a hypervisor used to manage a virtual machine computing environment executing the VMs sharing the memory space. Such software and/or device driver bugs may cause a guest VM and/or a hypervisor to crash in known systems without the protections described herein.

In known virtual machine environments, a source VM is allowed to control which of its memory pages can be accessed by a destination VM. Such sharing is often used to share I/O buffers of guest VMs with driver VMs. A guest VM is a VM that runs a respective operating system (OS) instance on an underlying host computer. Driver VMs support and interface with hardware devices. That is, a driver VM is a machine that hosts physical device drivers corresponding to respective hardware devices and performs hardware I/O operations on behalf of guest VMs.

To allow a driver VM to exchange information between hardware devices and one or more guest VMs, a grant mechanism may be used to grant the driver VM write and/or read access to shared I/O buffers (e.g., shared memory pages) of the guest VMs. Typically, I/O data is read from or written to guest VM I/O buffers by software executing in driver VMs or directly by hardware devices programmed by the driver VMs to perform direct memory access (DMA) transfers. However, while known grant mechanisms allow protecting shared memory of guest VMs from improper software accesses by ensuring that access to each target VM memory space has been granted, such known grant mechanisms do not enable protecting against improper access by hardware I/O devices that directly access the guest VMs' shared memory using, for example, DMA transfers.

Instead, protection of guest VMs' memory from hardware devices is provided through I/O memory management units (IOMMUs) as a separate mechanism from the above-described granting of shared memory access between VMs for protection from software accesses. An IOMMU provides address translation for hardware I/O devices so that all DMA memory accesses from such hardware I/O devices undergo address translation using an I/O page table (or IOMMU table). An IOMMU protects memory against improper I/O device accesses by ensuring that a valid address translation exists in the IOMMU table for each DMA request. In this manner, IOMMU tables can be used to protect against incorrect or malicious memory accesses from I/O devices to address spaces that are not shared and, thus, not translated in the IOMMU tables.

In known systems, grant mechanisms for protecting memory against improper software accesses and IOMMU tables for protecting memory against hardware I/O device accesses are implemented as separately controlled and managed mechanisms. Such known techniques place a complex burden on guest domains to coordinate their memory sharing with other domains and their associated hardware devices, rather than providing that coordination to the guest as a transparent service as provided by the example methods, apparatus, and articles of manufacture described herein.

Unlike known systems, as described above, example methods, apparatus, and articles of manufacture described herein utilize a memory protection mechanism that provides protection against improper memory accesses from both software running on VMs and hardware devices programmed to perform DMA transfers to/from memory spaces of the VMs. In particular, example methods, apparatus, and articles of manufacture enable a guest VM to selectively share memory pages with both another VM and a hardware I/O device programmed by that VM at the same time. A shared memory page (e.g., an I/O buffer) must be explicitly shared to enable access by the other VM and hardware I/O device. In this manner, corruption of a hypervisor or guest memory by any software or device driver bug can be prevented and/or the likelihood of such corruption is reduced.

FIG. 1 depicts an example virtual machine computing environment 100. The example VM environment 100 includes a hypervisor 102 in communication with a plurality of guest domains 104a-c, a driver domain 106, and hardware devices 108a-d. The hypervisor 102 (e.g., a virtual machine monitor (VMM)) is a virtual platform that allows multiple operating systems (OSs) (e.g., VM OSs such as the guest domains 104a-c and the driver domain 106) to run at the same time on a host computer 110. In the illustrated example, each of the guest domains 104a-c and the driver domain 106 is a separate virtual machine and the hypervisor 102 operates as an interface between the VM domains 104a-c and 106 and the hardware devices 108a-d by virtualizing the hardware devices 108a-d. The hypervisor 102 monitors execution of the VM domains 104a-c and 106 and manages memory access between the VM domains 104a-c and 106 and also manages memory access between the VM domains 104a-c and 106 and the hardware devices 108a-d. In some example implementations, the driver domain 106 may be implemented using a Xen® driver domain or a Xen® DOM0 domain.

In FIG. 1, each of the guest domains 104a-c has a corresponding memory space partitioned into a plurality of memory pages. Memory pages 112a-c of the guest domain 104a are shown by way of example. In the interest of brevity, the memory pages of the guest domains 104b and 104c are not shown, but the discussions of the memory pages 112a-c of the guest domain 104a apply equally well to the guest domains 104b and 104c. In the illustrated example of FIG. 1, the guest domains 104a-c share their memory pages and grant memory access to the driver domain 106. As such, the guest domains 104a-c in the example of FIG. 1 operate as source domains and the driver domain 106 operates as a destination domain to which the source domains grant memory access. In addition, the guest domains 104a-c grant access to their shared memory pages for access by the hardware devices 108a-d.

Turning to FIGS. 2 and 3, to implement protection from software accesses and hardware accesses, both a driver VM (DVM) virtual address space and an I/O address space of a device are partitioned in order to map pages from one or more of the guest VMs 104a-c for accessibility by other domains and/or hardware devices. In particular, FIG. 2 depicts an example DVM virtual address space table (or data structure) 200 and FIG. 3 depicts an example IOMMU table (or data structure) 300.

Referring to FIG. 2, the driver domain 106 allocates a virtual address mapping region in the DVM virtual address space table 200 every time it is to support a new guest VM (e.g., when one of the guest domains 104a-c is installed, opened, and/or booted). The DVM virtual address space table 200 enables software accesses to shared VM memory pages. In addition, the DVM virtual address space table 200 protects against improper memory accesses from software.

The DVM virtual address space table 200 is provided with a guest pages map 202 in a kernel memory space 204. In the illustrated example, the guest pages map 202 includes a separate guest virtual address mapping region 206a-c for each guest domain 104a-c, respectively. Each guest virtual address mapping region 206a-c functions as a virtual translation table for sharing memory pages of the corresponding guest domain 104a-c with the driver domain 106. For example, the memory pages 112a-c of the guest domain 104a can be shared by mapping them into the guest virtual address mapping region 206a. Preferably, but not necessarily, the allocated guest virtual address mapping region (e.g., one of the guest virtual address mapping region 206a-c) for a guest domain in the DVM virtual address space table 200 is large enough to map the maximum number of memory pages that the guest domain can use for I/O accesses at any instant in time. For example, a guest virtual address mapping region reserved in the DVM virtual address table 200 may be made large enough to map all of the memory pages allocated to a corresponding guest domain (e.g., the guest domain 104a). For instance, if the driver domain 106 uses a 64-bit virtual address space, the driver domain 106 can reserve address space ranges of the size of the entire physical memory of a host computer (e.g., the host computer 110 of FIG. 1) that has a 64-bit architecture using 64-bit addresses.

Referring to FIG. 3, the IOMMU table 300 enables hardware I/O devices (e.g., the devices 108a-d of FIG. 1) to access shared VM memory pages. The driver domain 106 reserves a range of I/O addresses in the IOMMU table 300 for each of the guest domains 104a-c (that is also allocated a mapping region in the DVM virtual address space table 200) to provide address translations between the virtual addresses of the DVM virtual address space table 200 and machine physical memory addresses of the guest domains 104a-c (i.e., guest addresses). The IOMMU table 300 protects against improper memory accesses from hardware I/O devices by ensuring that each memory access request from a hardware device provides a memory address for which a valid translation exists in the IOMMU table 300.

In the example implementations described herein, an IOMMU table substantially similar or identical to the IOMMU table 300 is initialized by the driver domain 106 for each hardware device (e.g., each of the hardware devices 108a-d of FIG. 1) supported by the driver domain 106. That is, each IOMMU table initialized by the driver domain 106 corresponds to a respective one of the hardware devices 108a-d exclusive of one another or any other hardware device. In this manner, when one of the guest domains 104a-c shares a memory page, the shared memory page can be shared explicitly with each of the devices 108a-d through respective regions allocated for the guest domains 104a-c in the IOMMU tables.

The IOMMU table 300 includes a guest pages map 302 and a local memory map 304. In the illustrated example of FIG. 3, the guest pages map 302 includes a separate guest IOMMU address mapping region 306a-c for each guest domain 104a-c used to translate between device addresses (or I/O addresses) of the hardware devices 108a-d and machine physical addresses of the guest domains 104a-c (i.e., guest addresses). For example, addresses for the memory pages 112a-c of the guest domain 104a can be translated by adding an address translation entry for each of them in the guest IOMMU address mapping region 306a.

The local memory map 304 is used to map virtual addresses of the driver domain 106 to driver domain addresses of its local I/O buffers so that the driver domain 106 can perform I/O operations using its local I/O buffers. In this manner, the IOMMU table 300 protects the local memory pages (e.g., local I/O buffers) of the driver domain 106 via the local memory map 304, while at the same time protecting the guest domains 104a-c via the guest pages map 302.

Figure 4:
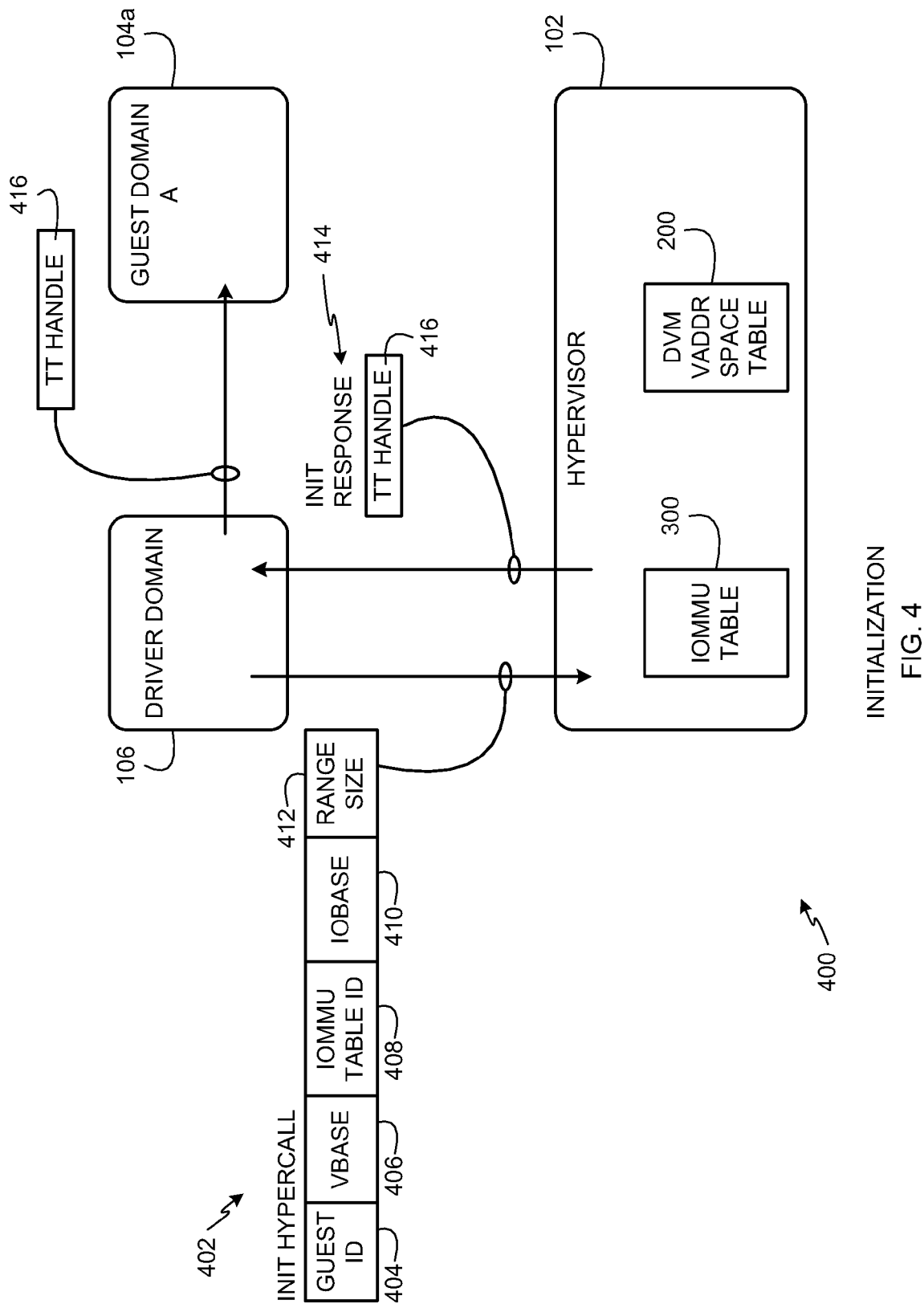
FIG. 4 depicts an example initialization process that may be used to initialize the DVM virtual address space data structure of FIG. 2 and/or the IOMMU table of FIG. 3 for sharing memory pages of virtual machine (VM) domains of the example virtual machine computing environment of FIG. 1.

FIG. 4 depicts an example initialization process 400 that may be used to initialize the DVM virtual address space table 200 of FIG. 2 and by the IOMMU table 300 of FIG. 3 for sharing the memory pages 112a-c of, for example, the guest domain 104a in the example VM computing environment 100 of FIG. 1. Although FIG. 4 illustrates an example involving the guest domain 104a, the same process is employed for the guest domain 104b and/or the guest domain 104c. In the illustrated example, when the driver domain 106 is to support a new guest domain (e.g., the guest domain 104a), the driver domain 106 issues an INIT hypercall 402 to the hypervisor 102 to initialize memory protection for the new guest domain. In some example implementations, the driver domain 106 is triggered or alerted to the need to support a new guest domain when the new guest domain is booted.

In the illustrated example, the INIT hypercall 402 includes a guest ID field 404, a VBASE field 406, an IOMMU table ID field 408, an IOBASE field 410, and a range size field 412. In the guest ID field 404, the driver domain 106 provides an identifier of one of the guest domains (e.g., the guest domain 104a). In the VBASE field 406, the driver domain 106 provides a base virtual address (VBASE(guest)) of the address range reserved for the guest domain (e.g., the guest domain 104a) in the virtual address space of the driver domain 106. In the illustrated example, the base virtual address is used to map virtual addresses for the shared memory pages (e.g., one or more of the memory pages 112a-c of FIG. 1) of the guest domain (e.g., the guest domain 104a) into one of the guest virtual address mapping regions 206a-c of FIG. 2. Referring briefly to FIG. 2, each of the guest virtual address mapping regions 206a-c starts at a respective base virtual address (e.g., VBASE(guest A), VBASE(guest B), VBASE(guest N)). Each of the memory pages 112a-c that is shared by the guest domain (e.g., the guest domain 104a) can subsequently be addressed in the guest virtual address mapping region 206a using an address offset relative to the base virtual address (VBASE(guest A)) of the guest domain (e.g., the guest domain 104a).

In the IOMMU table ID field 408, the driver domain 106 provides an identifier of an IOMMU table (e.g., the IOMMU table 300 of FIG. 3) associated with a hardware device (e.g., exclusively associated with one of the hardware devices 108a-d of FIG. 1) used by the driver domain 106 to perform I/O operations on behalf of the guest domain (e.g., the guest domain 104a). Such I/O operations can include, for example, network communications via a network interface card (e.g., one of the devices 108a-d of FIG. 1) so that the guest domain (e.g., the guest domain 104a) can communicate via a network.

In the IOBASE field 410, the driver domain 106 provides the base I/O address (IOBASE(guest)) of a corresponding one of the guest IOMMU address mapping regions 306a-c reserved for the guest domain (e.g., the guest domain 104a) in the IOMMU table 300 of FIG. 3. Referring briefly to FIG. 3, each of the guest IOMMU address mapping regions 306a-c starts at a respective base virtual address (e.g., IOBASE(guest A), IOBASE(guest B), IOBASE(guest N)). Each of the memory pages 112a-c that is shared by the guest domain (e.g., the guest domain 104a) can subsequently be addressed in the guest IOMMU address mapping region 206a using an address offset relative to the base I/O address (IOBASE(guest A)) of the guest domain (e.g., the guest domain 104a). In the illustrated examples described herein, a shared memory page is addressed using the same address offset in both the DVM virtual address space table 200 and the IOMMU table 300. Thus, the address offset used to access a particular memory page (e.g., one of the memory pages 112a-c of FIG. 1) via the DVM virtual address space table 200 is the same address offset used to access the same memory page via the IOMMU table 300.

In the range size field 412, the driver domain 106 provides the size of the address range reserved for the guest domain (e.g., the guest domain 104a) in a corresponding one of the guest virtual address mapping regions 206a-c and a corresponding one of the guest IOMMU address mapping regions 306a-c. That is, the size provided in the range size field 412 is equal to the address range size of the corresponding one of the guest virtual address mapping regions 206a-c reserved in the DVM virtual address space table 200 and equal to the address range size of the corresponding one of the guest IOMMU address mapping regions 306a-c reserved in the IOMMU table 300 such that the size of the reserved guest address space mappings in the DVM virtual address space table 200 and the IOMMU table 300 are the same.

If the driver domain 106 supports multiple hardware devices for a single guest domain, the driver domain 106 can send multiple INIT hypercalls 402 to the hypervisor 102 to initialize address mapping regions in each DVM virtual address space data structure and each IOMMU table of any hardware device with which a guest domain may share its memory pages. In the illustrated example, each INIT hypercall 402 may communicate a different IOMMU table ID (in the IOMMU table ID field 408) corresponding to a respective one of the hardware devices (e.g., respective ones of the hardware devices 108 a-d).

As shown in FIG. 4, the hypervisor 102 responds to the driver domain 106 with an INIT response 414 including a translation table (TT) handle 416. The driver domain 106 sends the TT handle 416 to the guest domain (e.g., the guest domain 104a). The TT handle 416 identifies a corresponding one of the guest virtual address mapping regions 206a-c. The guest domain (e.g., the guest domain 104a) can use the TT handle 416 during any subsequent memory access grant to identify the memory region in which the guest domain (e.g., the guest domain 104a) wishes to share a memory page. In the illustrative examples described herein, the TT handle 416 corresponds to an address space within a particular DVM virtual address space data structure (e.g., the DVM virtual address space table 200) corresponding to a particular hardware device (e.g., one of the hardware devices 108a-d of FIG.

1). Thus, when granting a memory page share (as described below in connection with FIG. 5), the guest domain (e.g., the guest domain 104a) can use the TT handle 416 to specify the hardware device with which it is requesting to share a memory page. The example initialization process 400 is described in greater detail below in connection with the flow diagram of FIG. 7.

Although the example initialization process 400 of FIG. 4 shows that the driver domain 106 sends the INIT hypercall 402 to initialize the guest domain for page sharing, in other example implementations, the guest domain may send the INIT hypercall 402 to the hypervisor 102 to invoke the initialization process and the hypervisor 102 may, in return, send the INIT response 414 to the guest domain. In such example implementations, the guest domain receives the TT handle 416 directly from the hypervisor 102, and sends the TT handle to the driver domain.

Figure 5:
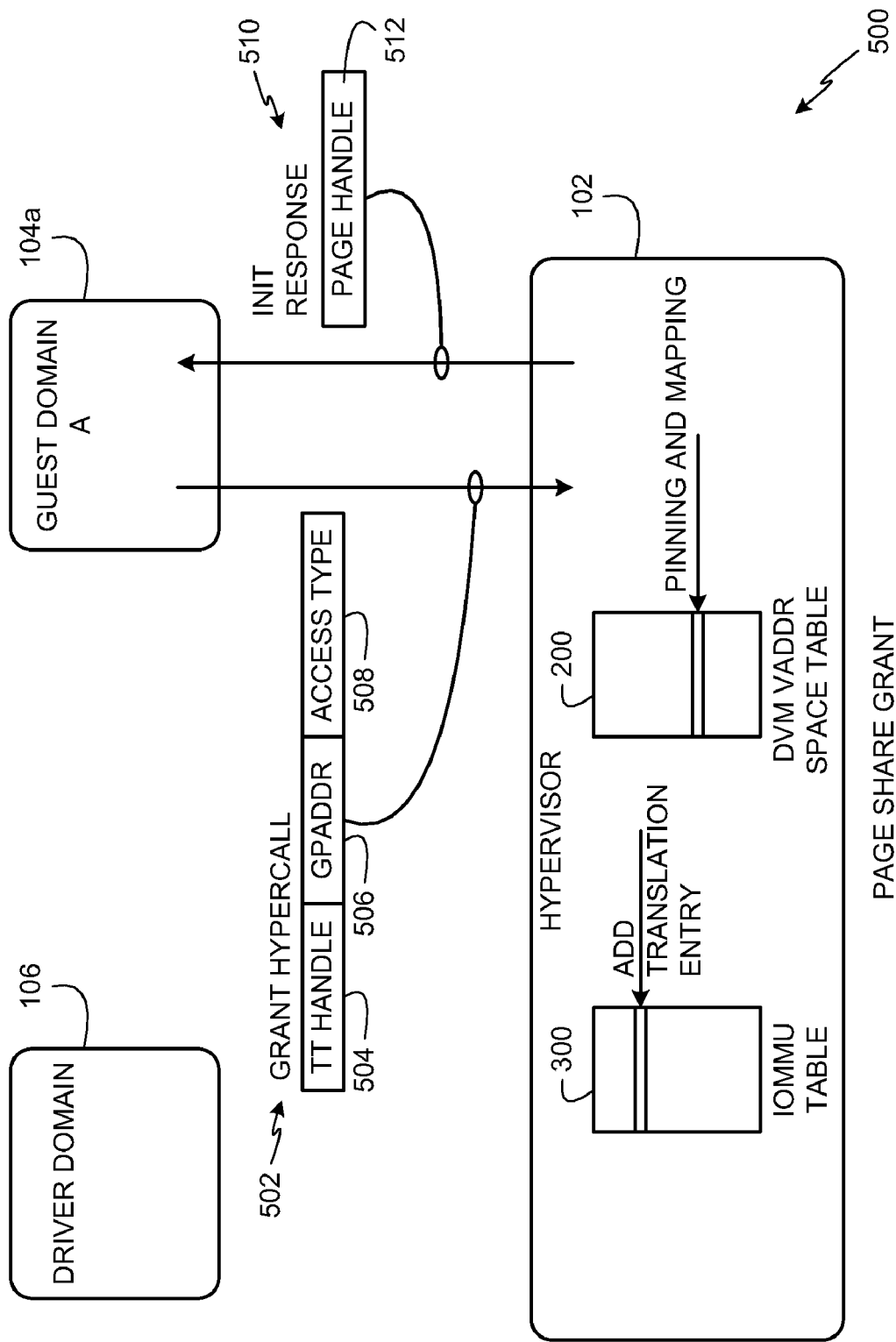
FIG. 5 illustrates an example grant process that may be used to grant the sharing of a memory page of a source domain with a destination domain in the example virtual machine computing environment of FIG. 1.

FIG. 5 illustrates an example grant process 500 that may be used to grant the sharing of a memory page (e.g., one of the memory pages 112a-c of FIG. 1) of a guest domain (a source domain) with the driver domain 106 (a destination domain) in the virtual machine computing environment 100 of FIG. 1. Although FIG. 5 illustrates an example involving the guest domain 104a, the same process is employed for the guest domain 104b and/or the guest domain 104c. In the illustrated example, when the guest domain 104a initiates the sharing of a memory page, the guest domain invokes a grant hypercall 502 to the hypervisor 102. The grant hypercall 502 enables the sharing of a memory page (e.g., one of the memory pages 112a-c of FIG. 1) for access by the driver domain 106 and the sharing of the same memory page with a hardware device (e.g., one of the hardware devices 108a-d of FIG. 1) for DMA transfers by the hardware device. The grant hypercall 502 includes a TT handle field 504, a GPADDR field 506, and an access type field 508. In the TT handle field 504, the guest domain (e.g., the guest domain 104a) provides the TT handle 416. In the GPADDR field 506, the guest domain (e.g., the guest domain 104a) provides a machine physical address of a guest page to be shared. Alternatively, the guest can provide a pseudo physical address. A pseudo physical address is the address in the area of memory allocated to the guest domain by the hypervisor 102. The pseudo physical address is perceived by the guest as a physical address but it is not a real machine address. That is, the guest domain interprets the pseudo physical address as its physical memory, but the pseudo physical address refers to a subset of real pages allocated to the guest domain by the hypervisor 102.

In the access type field 508, the guest domain (e.g., the guest domain 104a) provides an indicator of the type of access (e.g., read/write access or read only access) that the guest domain (e.g., the guest domain 104a) is granting for the shared memory page.

The hypervisor 102 responds by sending an INIT response 510 to the guest domain (e.g., the guest domain 104a). The INIT response 510 includes a page sharing handle 512 (HANDLE(page)), which can subsequently be used to make requests to the driver domain 106 to perform I/O operations with the memory page shared by the guest domain (e.g., the guest domain 104a). The page sharing handle 512 is an address offset to a corresponding memory page mapped in one of the guest virtual address mapping region 206a-c of FIG. 2 and a corresponding one of the guest IOMMU address mapping regions 306a-c of FIG. 3. The example grant process 500 is described in greater detail below in connection with the flow diagram of FIG. 8.

Figure 6:
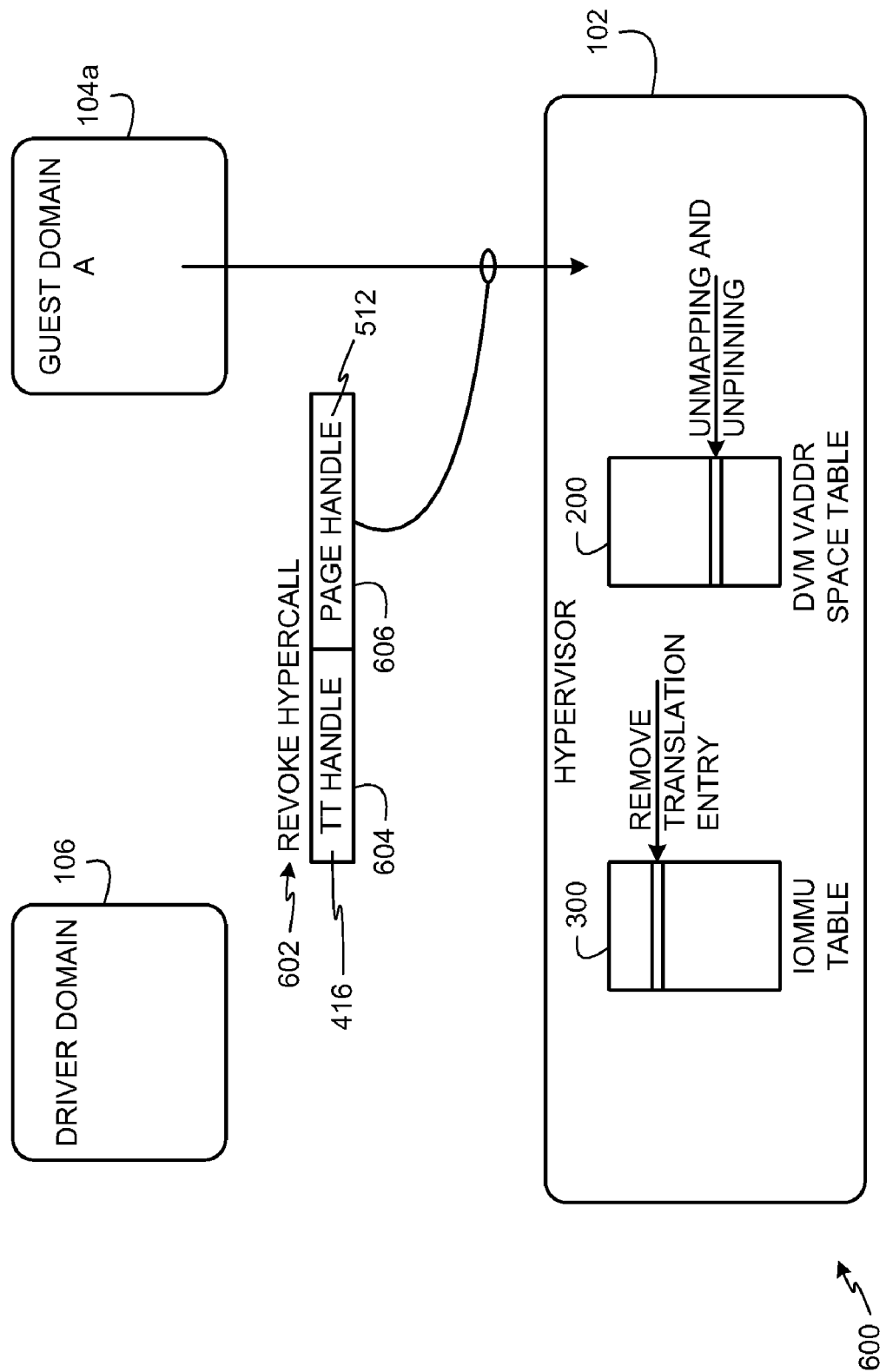
FIG. 6 illustrates an example revoke process that may be used to revoke the sharing of a memory page by a source domain in the example virtual machine computing environment of FIG. 1.

FIG. 6 illustrates an example revoke process 600 that may be used to revoke the sharing of a memory page by a guest domain (e.g., the guest domain 104a) in the example virtual machine computing environment 100 of FIG. 1. Although FIG. 6 illustrates an example involving the guest domain 104a, the same process is employed for the guest domain 104b and/or the guest domain 104c. As shown in FIG. 6, to revoke access to a memory page shared with the driver domain 106, the guest domain (e.g., the guest domain 104a) issues a revoke hypercall 602 to the hypervisor 102. The revoke hypercall 602 includes a TT handle field 604 in which the guest (e.g., the guest domain 104a) provides the TT handle 416 (FIG. 4) and a page handle field 606 in which the guest domain (e.g., the guest domain 104a) provides the page sharing handle 512 (FIG. 5). Any subsequent attempt to access the unshared memory page will be denied. In addition, if the guest domain (e.g., the guest domain 104a) misbehaves (e.g., allows a requested memory access when it should not) and if an I/O operation is in progress on a shared memory page after the guest domain revokes the sharing of the memory page, the driver domain 106 can detect the page fault and abort the operation. In such instances, the driver domain 106 can detect the page fault and abort the operation without crashing. The example revoke process 600 is described in greater detail below in connection with the flow diagram of FIG. 9.

Figure 7:
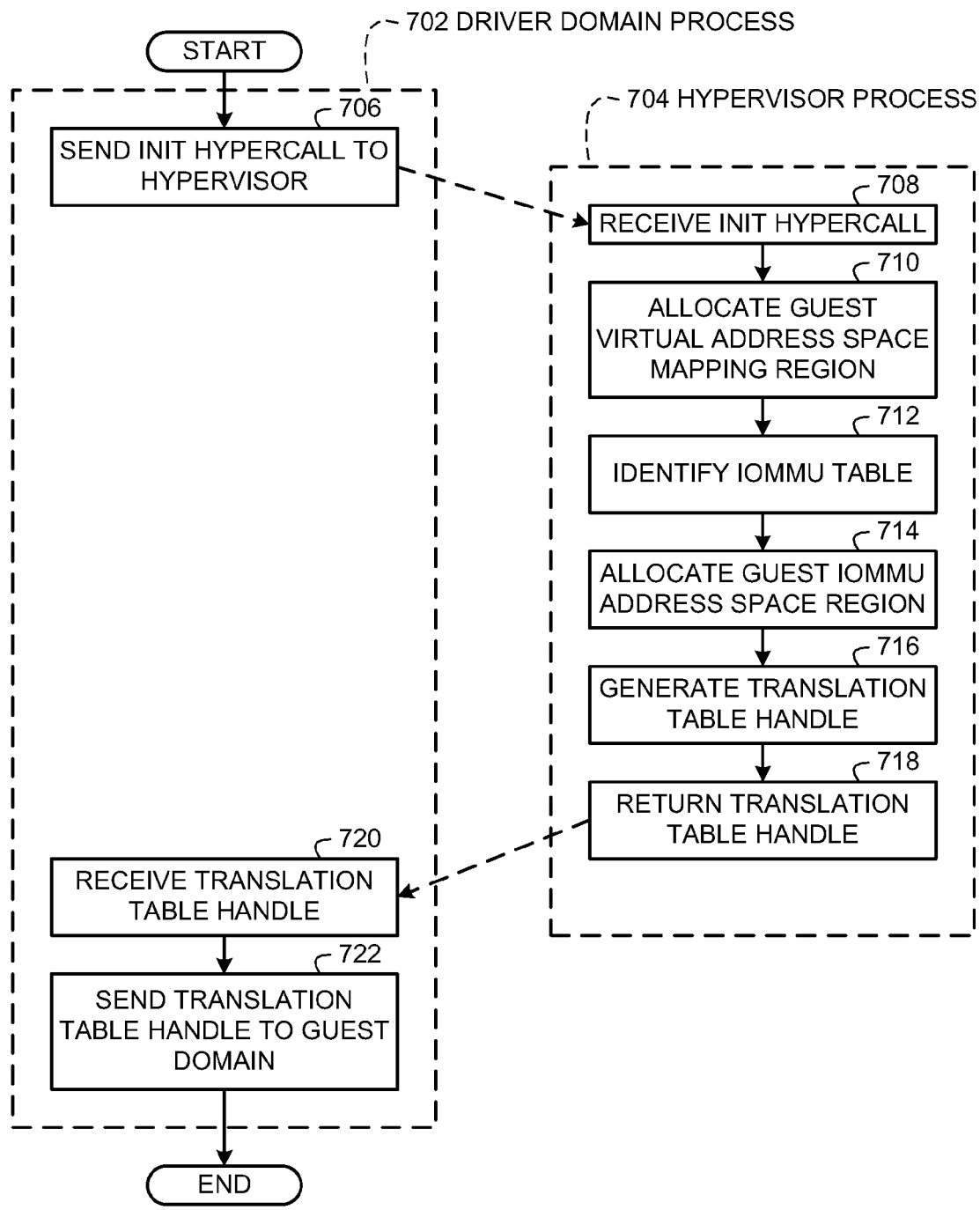
FIG. 7 depicts a flow diagram representative of example machine readable instructions that may be executed to initialize the DVM virtual address space data structure of FIG. 2 and/or the IOMMU table of FIG. 3 for sharing memory pages of virtual machine (VM) domains of the example virtual machine computing environment of FIG. 1.
Figure 8:
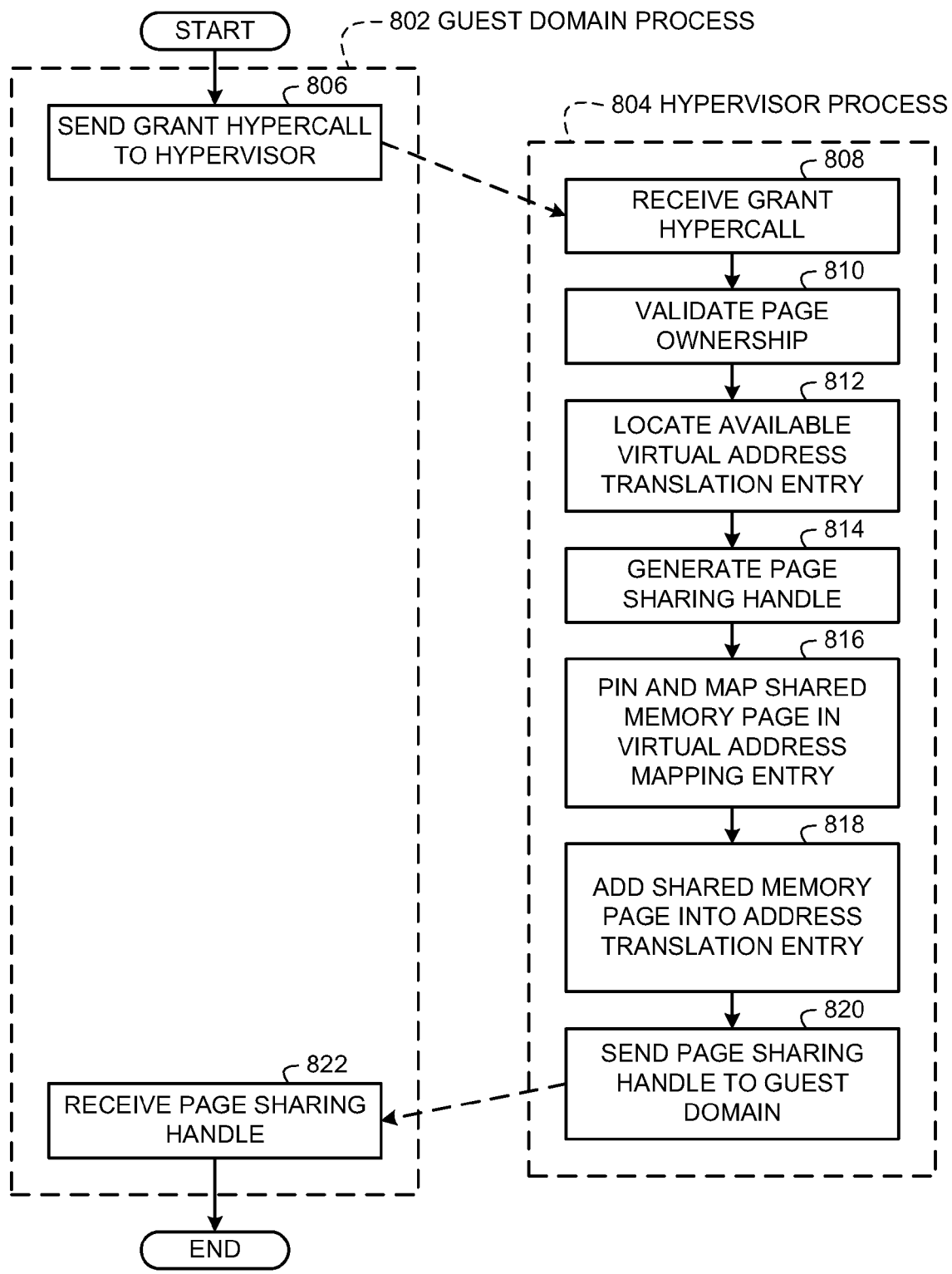
FIG. 8 depicts a flow diagram representative of example machine readable instructions that may be executed to grant the sharing of a memory page of a source domain with a destination domain in the example virtual machine computing environment of FIG. 1.
Figure 9:
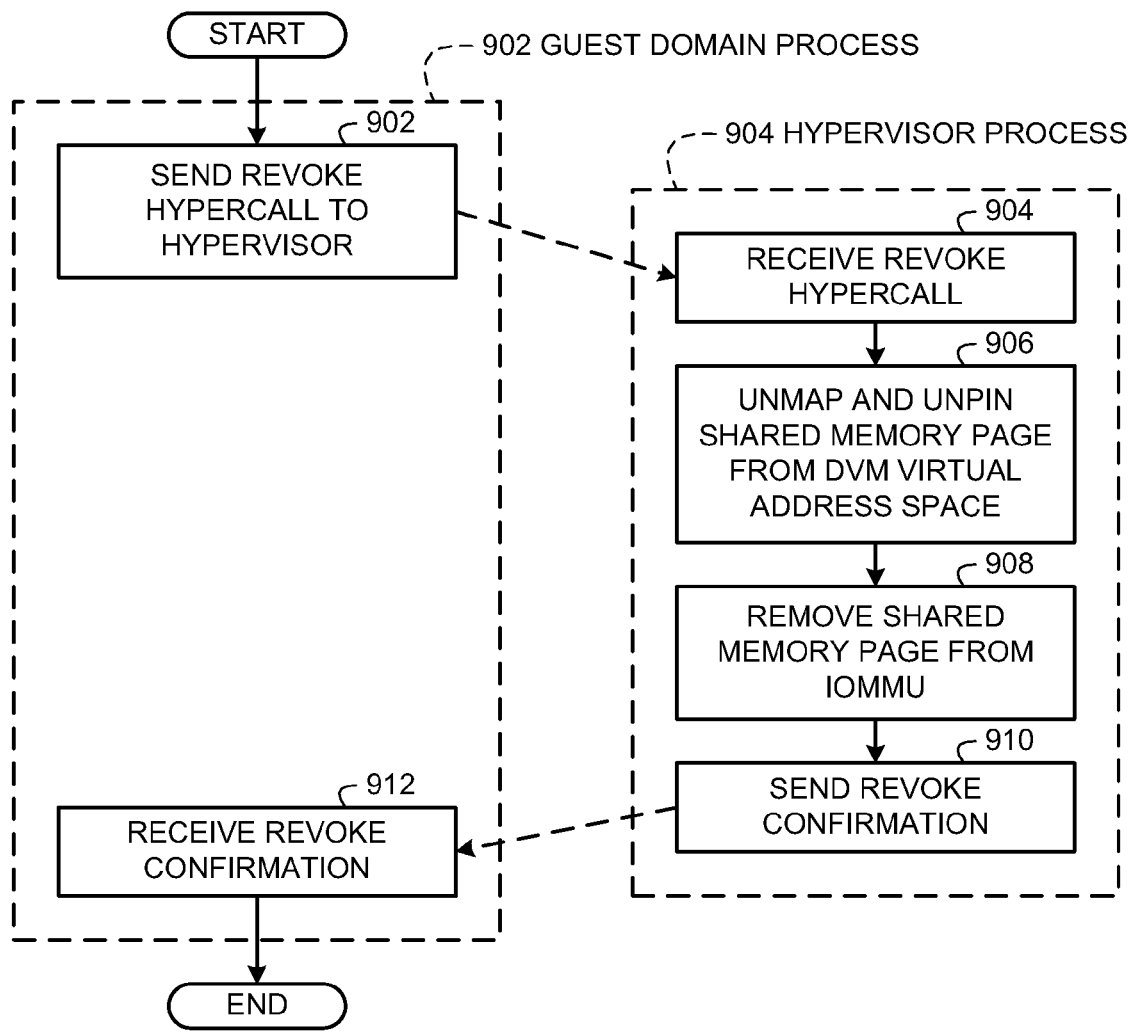
FIG. 9 depicts a flow diagram representative of example machine readable instructions that may be executed to revoke the sharing of a memory page by a source domain in the example virtual machine computing environment of FIG. 1.

FIGS. 7-9 depict example flow diagrams representative of processes that may be implemented using, for example, computer readable instructions that may be executed to implement the example virtual machine computing environment 100 of FIG. 1 and/or the example memory protection techniques disclosed herein. The example instructions of FIGS. 7-9 may be performed using one or more processors, controllers, and/or any other suitable processing devices. For example, the example processes of FIGS. 7-9 may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIGS. 7-9 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 7-9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 7-9 may be implemented manually or as any combination(s) of any of the foregoing techniques, for example, any combination of firmware, software, discrete logic and/or hardware. Further, although the example processes of FIGS. 7-9 are described with reference to the flow diagrams of FIGS. 7-9, other methods of implementing the processes of FIGS. 7-9 may be employed. For example, the order of execution of the blocks may be changed, and/or some of the blocks described may be changed, eliminated, sub-divided, or combined. Additionally, any or all of the example processes of FIGS. 7-9 may be performed sequentially and/or in parallel by, for example, separate processing threads, processors, devices, discrete logic, circuits, etc.

Although the flow diagrams of FIGS. 7-9 are described in connection with the guest domain 104a (e.g., a source domain or source VM) and the driver domain 106 (e.g., a destination domain or destination VM) of FIG. 1, the described example processes may alternatively be implemented in the same or similar manner using any other source and destination domains including, for example, the guest domains 104b-c.

Now turning to FIG. 7, a flow diagram depicts example processes that may be used to initialize the DVM virtual address space table 200 of FIG. 2 and the IOMMU table 300 of FIG. 3 for sharing memory pages of the guest domain 104a of the example virtual machine computing environment 100 of FIG. 1. The flow diagram of FIG. 7 is described in connection with the example initialization process 400 of FIG. 4. In the illustrated example of FIG. 7, the driver domain 106 performs an example driver domain process 702 and the hypervisor 102 performs an example hypervisor process 704.

Initially, the driver domain 106 sends the INIT hypercall 402 (FIG. 4) to the hypervisor 102 (block 706). The hypervisor 102 receives the INIT hypercall 402 (block 708) and allocates the guest virtual address space mapping region 206a (FIG. 2) (block 710). For example, the hypervisor 102 uses the base virtual address (VBASE(guest)) in the VBASE field 406 (FIG. 4) and the size of the address range in the range size field 412 (FIG. 4) to reserve the guest virtual address space mapping region 206a for the guest domain 106a in the DVM virtual address space table 200 of FIG. 2.

The hypervisor 102 identifies an IOMMU table (e.g., the IOMMU table 300 of FIG. 3) (block 712). For example, the hypervisor 102 uses the IOMMU table identifier in the IOMMU table ID field 408 (FIG. 4) to locate the IOMMU table at block 712 corresponding to a hardware device (e.g., one of the hardware devices 108a-d of FIG. 1) for which the initialization process will enable page sharing.

The hypervisor 102 allocates the IOMMU address mapping region 306a (block 714). For example, the hypervisor 102 uses the base I/O address (IOBASE(guest)) in the IOBASE field 410 (FIG. 4) and the size of the address range in the range size field 412 (FIG. 4) to allocate the IOMMU address mapping region 306a for the guest domain 104a in the IOMMU table 300 of FIG. 3.

The hypervisor 102 generates a translation table handle (e.g., the TT handle 416 of FIG. 4) (block 716) to identify the IOMMU address mapping region 306a corresponding to the guest domain 104a. The hypervisor 102 sends the TT handle 416 to the driver domain 106 (block 718).

The driver domain 106 receives the TT handle 416 (block 720) and sends the TT handle 416 to the guest domain 104a (block 722). The example processes 702 and 704 then end. Alternatively, the example processes 702 and 704 may be repeated to initialize IOMMU address mapping regions in other IOMMU tables to enable the guest domain 104a to share memory pages with other hardware devices corresponding to the other IOMMU tables.

Turning to FIG. 8, a flow diagram depicts example processes that may be used to grant the sharing of a memory page of the guest domain 104a with the driver domain 106 in the virtual machine computing environment 100 of FIG. 1. The flow diagram of FIG. 8 is described in connection with the example grant process 500 of FIG. 5. In the illustrated example of FIG. 8, the guest domain 104a performs an example guest domain process 802 and the hypervisor 102 performs an example hypervisor process 804.

Initially, the guest domain 104a sends the grant hypercall 502 (FIG. 5) to the hypervisor 102 (block 806). The grant hypercall 502 enables the sharing of a memory page (e.g., one of the memory pages 112a-c of FIG. 1) for access by the driver domain 106 and the sharing of the same memory page with a hardware device (e.g., one of the hardware devices 108a-d of FIG. 1) for DMA transfers by the hardware device. The hypervisor 102 receives the grant hypercall 502 (block 808) and validates the ownership of the memory page to be shared (block 810). For example, the hypervisor 102 confirms that the memory page (e.g., one of the memory pages 112a-c of FIG. 1) to be shared actually belongs to the guest domain 104a by determining whether the TT handle 416 in the TT handle field 504 (FIG. 5) points to a guest virtual address mapping region (e.g., one of the guest virtual address mapping regions 206a-c of FIG. 2) allocated to the guest domain 104a. (If the memory page does not belong to the guest domain 104a, the hypervisor 102 rejects the grant request.)

The hypervisor 102 locates an available virtual address translation entry (block 812) in the guest virtual address mapping region 206a allocated to the guest domain 104a. The hypervisor 102 generates the page sharing handle 512 (FIG. 5) (block 814). The hypervisor 102 pins and maps the shared memory page (e.g., one of the memory pages 112a-c of FIG. 1) in the virtual address mapping entry of the guest virtual address mapping region 206a (block 816). In addition, the hypervisor 102 adds the shared memory page into an address translation entry of the guest virtual address mapping region 206a allocated to the guest domain 104a (block 818). The hypervisor 102 sends the page sharing handle 512 to the guest domain 104a (block 820).

The guest domain 104a receives the page sharing handle 512 (block 822). The example processes 802 and 804 of FIG. 8 then end.

FIG. 9 depicts a flow diagram of example processes that may be used to revoke the sharing of a memory page (e.g., one of the memory pages 112a-c of FIG. 1) by the guest domain 104 in the virtual machine computing environment 100 of FIG. 1. The flow diagram of FIG. 9 is described in connection with the example revoke process 600 of FIG. 6. In the illustrated example of FIG. 9, the guest domain 104a performs an example guest domain process 902 and the hypervisor 102 performs an example hypervisor process 904.

Initially, the guest domain 104a sends the revoke hypercall 602 (FIG. 6) to the hypervisor 102 (block 902). For example, the guest domain 104a may revoke a page share because I/O operations are completed or because the guest domain 104a will use the page for other purposes and needs to protect it from accesses in accordance with the previously granted sharing.

The hypervisor 102 receives the revoke hypercall 602 (block 904). The hypervisor 102 unmaps and unpins the shared memory page from the guest virtual address mapping region 206a of the DVM virtual address space table 200 (block 906). In addition, the hypervisor 102 removes the shared memory page from the guest IOMMU address mapping region 306a of the IOMMU table 300 (block 908). The hypervisor 102 sends a revoke confirmation to the guest domain 104a (block 910). The guest domain 104a receives the revoke confirmation (block 912), and the example processes 902 and 904 of FIG. 9 end. Subsequent attempts by the driver domain 106 or a hardware device (e.g. the hardware device 108a) to access the unshared memory page will be denied. In addition, if an I/O operation is in progress on a shared memory page after the guest domain 104a revokes the sharing of the memory page, the driver domain 106 can detect a page fault and abort the operation. In this manner, source domains such as the guest domain 104a can use the example techniques described herein to revoke access to a shared memory page unilaterally without requiring consent or cooperation from destination domains such as the driver domain 106. Not requiring such consent or cooperation provides the source domain with more control over its sharing to immediately disallow sharing, thus reducing processing overhead, increasing throughput of the hypervisor 102, and reducing the amount of time during which shared memory can remain vulnerable to improper access.

Figure 10:
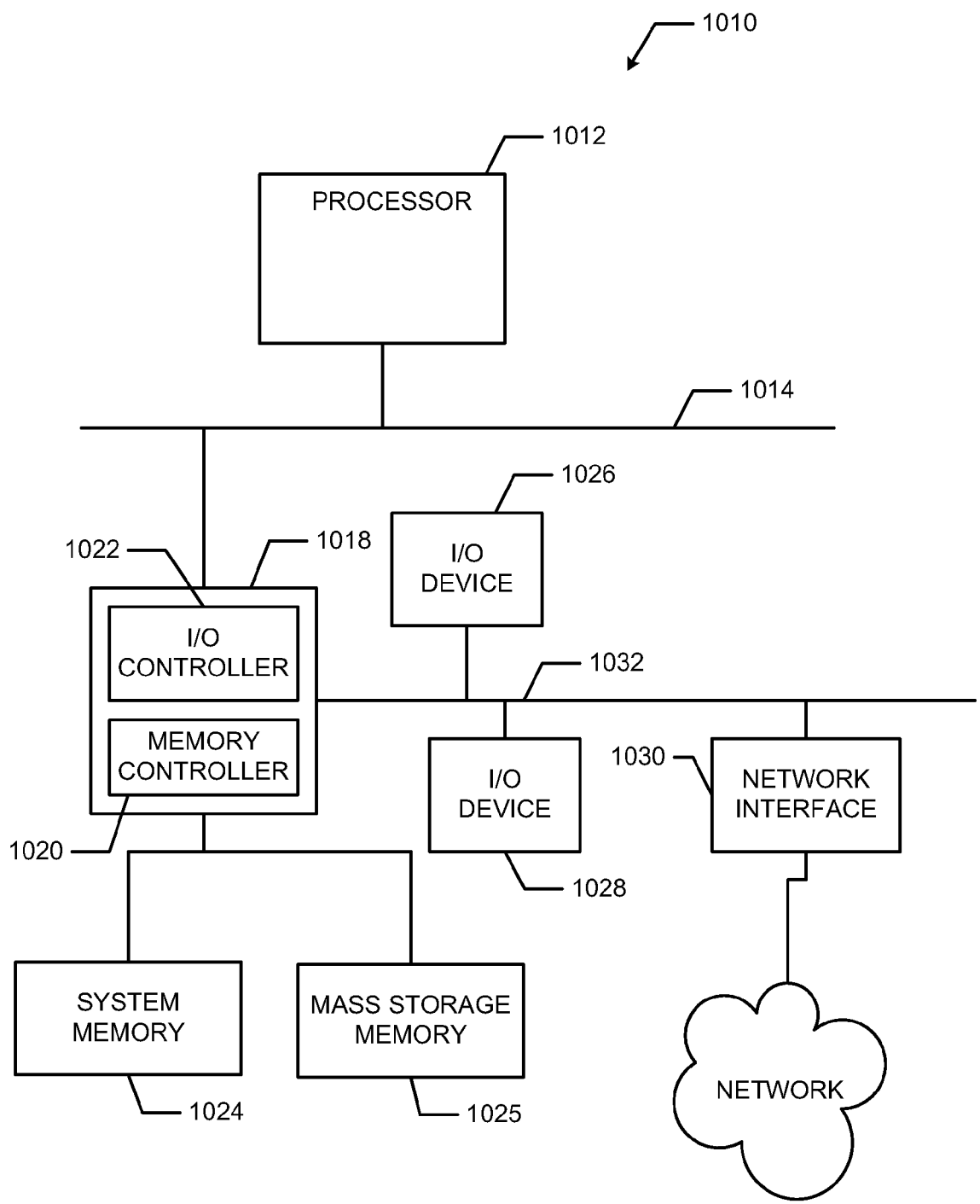
FIG. 10 is an example processor system that can be used to execute the example instructions of FIGS. 7, 8, and/or 9 to implement the example virtual machine computing environment of FIG. 1 and/or the example memory protection techniques disclosed herein.

FIG. 10 is a block diagram of an example processor system 1010 that may be used to implement the example methods, apparatus, and articles of manufacture described herein. For example, a processor system substantially similar or identical to the example processor system 1010 may be used to implement the host computer 110 to host the example virtual machine environment 100 of FIG. 1.

As shown in FIG. 10, the processor system 1010 includes a processor 1012 that is coupled to an interconnection bus 1014. The processor 1012 may be any suitable processor, processing unit, or microprocessor. Although not shown in FIG. 10, the system 1010 may be a multi-processor system and, thus, may include one or more additional processors that are identical or similar to the processor 1012 and that are communicatively coupled to the interconnection bus 1014.

The processor 1012 of FIG. 10 is coupled to a chipset 1018, which includes a memory controller 1020 and an input/output (I/O) controller 1022. A chipset provides I/O and memory management functions as well as a plurality of general purpose and/or special purpose registers, timers, etc. that are accessible or used by one or more processors coupled to the chipset 1018. The memory controller 1020 performs functions that enable the processor 1012 (or processors if there are multiple processors) to access a system memory 1024 and a mass storage memory 1025.

In general, the system memory 1024 may include any desired type of volatile and/or non-volatile memory such as, for example, static random access memory (SRAM), dynamic random access memory (DRAM), flash memory, read-only memory (ROM), etc. The mass storage memory 1025 may include any desired type of mass storage device including hard disk drives, optical drives, tape storage devices, etc.

The I/O controller 1022 performs functions that enable the processor 1012 to communicate with peripheral input/output (I/O) devices 1026 and 1028 and a network interface 1030 via an I/O bus 1032. The I/O devices 1026 and 1028 may be any desired type of I/O device such as, for example, a keyboard, a video display or monitor, a mouse, etc. The network interface 1030 may be, for example, an Ethernet device, an asynchronous transfer mode (ATM) device, an 802.11 device, a digital subscriber line (DSL) modem, a cable modem, a cellular modem, etc. that enables the processor system 1010 to communicate with another processor system.

While the memory controller 1020 and the I/O controller 1022 are depicted in FIG. 10 as separate functional blocks within the chipset 1018, the functions performed by these blocks may be integrated within a single semiconductor circuit or may be implemented using two or more separate integrated circuits.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims.

What is claimed is:

1. A method to share memory resources between first and second virtual machines, the method comprising:
    enabling sharing of a memory page of a source domain executing on a first virtual machine with a destination domain executing on a second virtual machine;
    allocating a virtual address mapping region for the memory page of the source domain in a virtual address space of the destination domain by allocating a memory range in the virtual address space, the memory range mapped to a base virtual address of the source domain, and the base virtual address received in an initialization request from the destination domain;
    adding an address translation entry for the memory page in a table;
    operating a hypervisor to service a grant request from the source domain to provide the destination domain and a hardware device with access to the memory page of the source domain; and
    maintaining the allocated virtual address mapping region in the virtual address space until a revoke request is received at the hypervisor from the source domain, the revoke request including a translation table handle field and a page handle field to deny attempts to access the memory page when it is unshared.

2. A method as defined in claim 1, wherein the table is an input/output memory management unit (IOMMU) table.

3. A method as defined in claim 2, further comprising:
    removing the address translation entry from the IOMMU table and unmapping the memory page from the virtual address space of the destination domain after the revoke request is received from the source domain.

4. A method as defined in claim 1, wherein the allocating of the virtual address mapping region for the memory page, and the adding of the address translation entry are performed by the hypervisor.

5. A method as defined in claim 1, wherein the source domain is a guest domain and the destination domain is a driver domain, the driver domain to exchange information between the source domain and the hardware device.

6. An apparatus to share memory resources between first and second virtual machines, the apparatus comprising:
    a processor; and
    a memory having instructions stored thereon that, when executed, cause the processor to at least:
    respond to an initialization request to initialize a first virtual machine for sharing memory of the first virtual machine by:
    initializing a first input/output memory management unit (IOMMU) table for a first device; and
    allocating a virtual address mapping region for the memory of the first virtual machine in a virtual address space table of a second virtual machine by allocating a memory range in the virtual address space table, the memory range mapped to a base virtual address of the first virtual machine, and the base virtual address received in the initialization request;

operate a hypervisor to service a grant request from the first virtual machine to share the memory of the first virtual machine with the second virtual machine; and unmap the allocated virtual address mapping region from the virtual address space table when a revoke request is received at the hypervisor from the first virtual machine, the revoke request including a translation table handle field and a page handle field to deny attempts to access the memory when it is unshared.

7. An apparatus as defined in claim 6, wherein the instructions, when executed, further cause the processor to initialize a second IOMMU table for a second device in response to a second initialization request associated with initializing the sharing of the memory of the first virtual machine in the virtual machine environment.

8. An apparatus as defined in claim 7, wherein the instructions, when executed, further cause the processor to initialize a first mapping region in the first IOMMU table corresponding to a memory page shared by the first virtual machine and a second mapping region in the second IOMMU table corresponding to the memory page shared by the first virtual machine.

9. An apparatus as defined in claim 6, wherein the second virtual machine is a driver virtual machine and the first virtual machine is a guest virtual machine.

10. An apparatus as defined in claim 6, wherein the instructions, when executed, further cause the processor to generate the translation table handle for use by the first virtual machine to identify the virtual address mapping region corresponding to the first virtual machine in the virtual address space table.

11. An apparatus as defined in claim 6, wherein the first IOMMU table and the virtual address space table are initialized by the hypervisor executed by the processor.

12. An apparatus as defined in claim 6, wherein the initialization request includes:

the base virtual address of the memory;

a base virtual input/output address of the memory to allocate an IOMMU address mapping region corresponding to the first virtual machine in the IOMMU table; and a range size value indicative of a size of the virtual address mapping region and indicative of a size of the IOMMU address mapping region.

13. A tangible machine readable storage device or storage disc comprising instructions that, when executed, cause a machine to at least:

enable sharing of a memory page of a source domain executing on a first virtual machine with a destination domain executing on a second virtual machine;

allocate a virtual address mapping region for the memory page of the source domain in a virtual address space of the destination domain by allocating a memory range in the virtual address space, the memory range mapped to a base virtual address of the source domain, and the base virtual address received in an initialization request from the destination domain;

add an address translation entry for the memory page in a table;

operate a hypervisor to service a grant request from the source domain to provide the destination domain and a hardware device with access to the memory page of the source domain; and maintain the allocated virtual address mapping region in the virtual address space until a revoke request is received at the hypervisor from the source domain, the revoke request including a translation table handle field and a page handle field to deny attempts to access the memory page when it is unshared.

14. The tangible machine readable storage device or storage disc as defined in claim 13, wherein the table is an input/output memory management unit (IOMMU) table.

15. The tangible machine readable storage device or storage disc as defined in claim 14 having instructions stored thereon that, when executed, further cause the machine to use the address translation entry in the IOMMU table to verify and translate addresses associated with direct memory access (DMA) transfers between the hardware device and the memory page.

16. The tangible machine readable storage device or storage disc as defined in claim 14 having instructions stored thereon that, when executed, further cause the machine to:

remove the address translation entry from the IOMMU table and unmap the memory page from the virtual address space of the destination domain after the revoke request is received from the source domain.

17. The tangible machine readable storage device or storage disc as defined in claim 13, wherein the allocating of the virtual address mapping region for the memory page, and the adding of the address translation entry are performed by the hypervisor.

18. The tangible machine readable storage device or storage disc as defined in claim 13, wherein the source domain is a great domain and the destination domain is a driver domain, the driver domain to exchange information between the source domain and the hardware device.

* * * * *

UNITED STATES PATENT AND TRADEMARK OFFICE
CERTIFICATE OF CORRECTION

PATENT NO. : 8,392,628 B2
APPLICATION NO. : 12/838256
DATED : March 5, 2013
INVENTOR(S) : Jose Renato G. Santos et al.

It is certified that error appears in the above-identified patent and that said Letters Patent is hereby corrected as shown below:

In the Claims

In column 13, line 37, in Claim 11, delete "hypervisor executed by the processor." and insert -- hypervisor. --, therefor.

In column 14, line 46, in Claim 18, delete "great" and insert -- guest --, therefor.

Signed and Sealed this
Tenth Day of September, 2013

Teresa Stanek Rea
*Acting Director of the United States Patent and Trademark Office*